United States Patent
MacDuff

(10) Patent No.: US 6,523,862 B1
(45) Date of Patent: Feb. 25, 2003

(54) TUBING CONNECTOR WITH INTEGRATED CRIMP RING AND REAMING TOOL FOR USE THEREWITH

(75) Inventor: James MacDuff, 1284 Montrose Avenue, Victoria B.C. (CA), V8T 2K6

(73) Assignee: James MacDuff, Victoria (CA)

( * ) Notice: Subject to any disclaimer, the term of this patent is extended or adjusted under 35 U.S.C. 154(b) by 0 days.

(21) Appl. No.: 09/808,709

(22) Filed: Mar. 14, 2001

(51) Int. Cl.[7] .......................... B21D 39/00; F16L 35/00
(52) U.S. Cl. ................................ 285/256; 285/93
(58) Field of Search ..................... 285/93, 256, 259, 285/382, 39

(56) References Cited

U.S. PATENT DOCUMENTS

| | | | |
|---|---|---|---|
| 398,582 A | 2/1889 | Cowen | 285/256 |
| 724,129 A | 3/1903 | Schrader | 285/256 |
| 1,926,270 A * | 9/1933 | Eastman | 285/256 |
| 1,944,890 A * | 1/1934 | Heidloff | 285/256 |
| 2,028,316 A * | 1/1936 | Brunner | 285/256 |
| RE20,629 E * | 1/1938 | Eisenman | 285/256 |
| 2,310,250 A * | 2/1943 | Melson | 285/256 |
| 2,310,536 A * | 2/1943 | Melson | 285/256 |
| 2,319,586 A * | 5/1943 | Clench | 285/256 |
| 2,341,003 A * | 2/1944 | Watson | 285/256 |
| 2,374,225 A * | 4/1945 | Melsom | 285/256 |
| 2,446,599 A * | 8/1948 | Knaggs | 285/256 |
| 2,453,997 A * | 11/1948 | MacWilliam | 285/256 |
| 2,560,565 A * | 7/1951 | Freeman | 285/256 |
| 2,810,594 A * | 10/1957 | Walsh et al. | 285/256 |
| 2,978,263 A * | 4/1961 | Walsh et al. | 285/256 |
| 3,112,939 A | 12/1963 | Graham | 285/238 |
| 3,185,500 A * | 5/1965 | Luther | 285/256 |
| 3,659,880 A * | 5/1972 | Goldsobel | 285/243 |
| 4,603,890 A | 8/1986 | Huppee | 285/239 |
| 5,364,134 A | 11/1994 | Anderson | 285/38 |
| 5,378,023 A | 1/1995 | Olbrich | 285/24 |
| 5,480,196 A | 1/1996 | Adams, Jr. | 285/369 |
| 5,722,150 A * | 3/1998 | Swanson, III | 285/256 |
| 6,000,730 A * | 12/1999 | Owens | 285/256 |
| 6,095,571 A | 8/2000 | MacDuff | 285/256 |

* cited by examiner

Primary Examiner—Eric K. Nicholson
(74) Attorney, Agent, or Firm—Dority & Manning, P.A.

(57) ABSTRACT

A tubing connector for synthetic or composite tubing includes an integral crimp ring. The crimp ring permitting the tubing connector to be rotated in the tubing after the crimp ring is crimped. The integral crimp ring simplifies and facilitates installation of the tubing connector and ensures accurate crimping for more consistent results and fewer leaky connections. A reaming tool enlarges and bevels the open end of the tubing to facilitate the insertion of the tubing connector into the tubing. The reaming tool has a guide screw so that the open end of the tubing is automatically drawn towards cutters on the tool when the guide screw is rotated in the tubing. The advantage is a perfect bevel and an accurate expansion with very little effort.

6 Claims, 4 Drawing Sheets

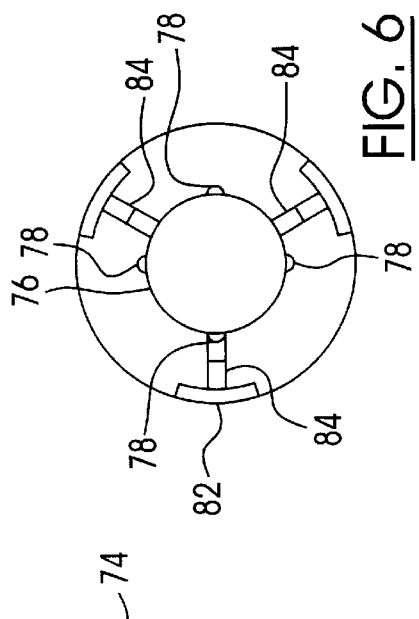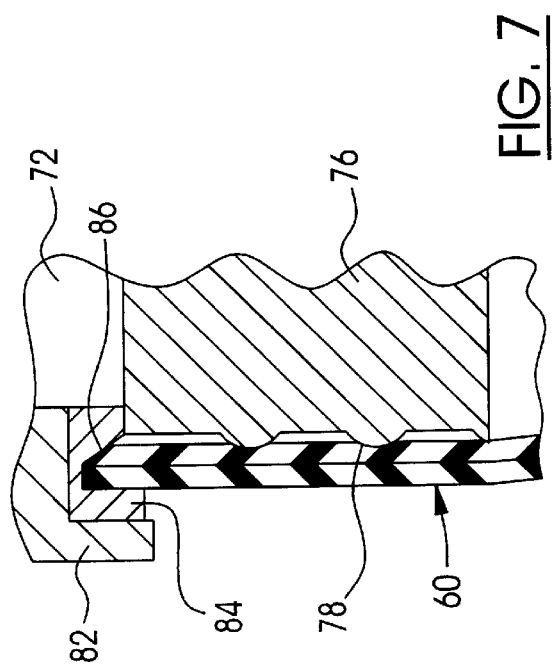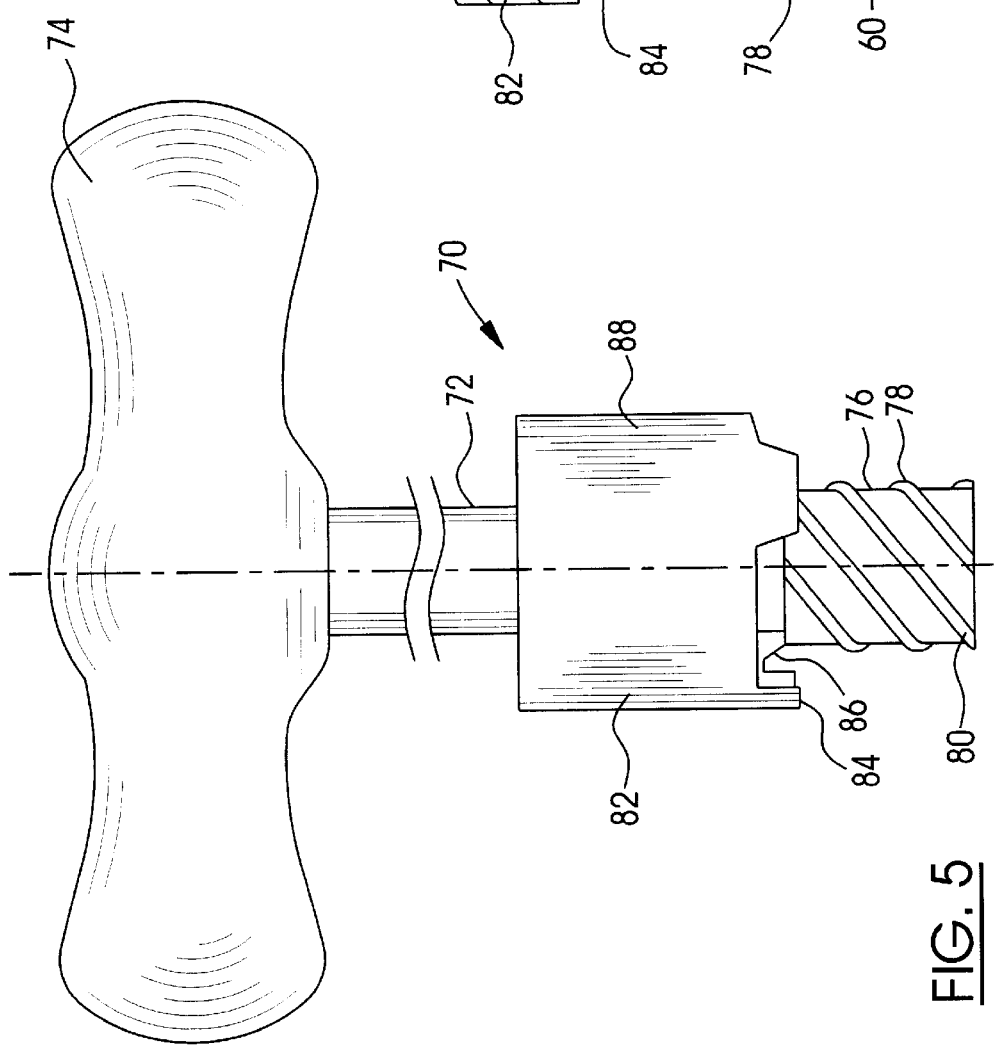

TUBING CONNECTOR WITH INTEGRATED CRIMP RING AND REAMING TOOL FOR USE THEREWITH

CROSS-REFERENCE TO RELATED APPLICATIONS

This is the first application filed for the present invention.

MICROFICHE APPENDIX

Not Applicable.

TECHNICAL FIELD

This invention relates to tubing coupling devices and, more particularly, to a tubing connector for expediting coupling of a tubing used in pressurized fluid systems.

BACKGROUND OF THE INVENTION

In the plumbing industry, tubing made from polymer or composites is gaining acceptance and the applications for such tubing have been developing rapidly. Synthetic tubings are made from cross-linked polyethylene, for example, and are used for water distribution systems. Composite tubing is a multi-layer tubing which generally consists of an inner layer of a plastic material, an intermediate layer of aluminium alloy and an outer layer of a plastic material. Composite tubing provides the advantages of both metal and plastics and is used for a wide range of applications because of its flexibility and strength, especially its resistance to rupture when subject ed to relatively high temperature and pressure. Multi-purpose composite pressure tubing can be used both indoors and outdoors, cast in concrete, concealed in walls, floors and ceilings or surface mounted. It can be used for hot and cold water distribution, under surface floor heating, ice melt systems for sidewalks and driveways, air conditioning systems, compressed air and industrial process piping. Composite tubing is available, for example, from IPEX, which produces tubing (KITEC®) consisting of aluminium tubing laminated between two layers of polyethylene. To produce this tubing, an aluminium strip is formed, overlapped and then ultrasonically welded. Layers of a polyethylene are then applied with adhesive to form a bond with the aluminium tubing. The result is a tubing that does not rust, corrode or tuberculate. Couplings for synthetic and composite tubing are commercially available.

U.S. Pat. No. 6,095,571, entitled TUBING CONNECTOR which issued on Aug. 1, 2000, Applicant describes a tubing connector for use with synthetic and composite tubing. Elastic seal rings are supported in grooves in an external periphery of a connector portion of the tubing connector. Each of the grooves has a depth that approximates a thickness of the seal ring and a width greater than the width of the seal ring. When the connector portion is inserted in the tubing and radial pressure is exerted on the tubing by a crimp ring, the plastic in an inner periphery of the tubing intrudes into each annular groove and further compresses the seal ring inwardly in the groove. The remainder of the tubing overlapped by the crimp ring is compressed tightly around the external periphery of the connector portion.

In the prior art, crimp rings are a separate component of the tubing connector. Consequently, the crimp rings are sold separately and it is not always clear as to which crimp ring is suitable for a particular connector. Furthermore, when a tubing connector is being installed the crimp ring is first slid over the end of the tubing and then the tubing connector is inserted into an end of the tubing. While the tubing connector is inserted into the end of the tubing, the crimp ring, if not restrained, is able to move freely along the tubing. This may cause some inconvenience, particularly when a connector is applied to a long run of vertically oriented tubing. Besides having to hold the crimp ring while inserting the tubing, it is also necessary to hold the crimp ring while the crimping tool is positioned. If space is limited around the tubing, this may be difficult to do. In many situations it is also difficult to ensure that the crimp ring is in an optional location when it is crimped. This is generally due to the fact that visibility or access to the tubing is restricted by surrounding structure. If the crimp ring is not crimped at the optional location over the connector, the connection may break. There therefore exists a need for an improved tubing connector that facilitates installation.

In order to facilitate the insertion of a tubing connector into the end of a composite tubing, a reaming tool is usually used to enlarge and bevel the end of the tubing. Prior art reaming tools generally include an elongated shaft that carries cutters for bevelling an inside end of the tubing. Each cutter has a cutting edge oriented at a predetermined angle with respect to the central axis of the elongated shaft. The shaft has a diameter slightly greater than an internal diameter of the tubing. One end of the shaft is tapered for easy insertion into the end of the tubing, and the other end is usually attached to a handle. When the tapered end of the shaft is inserted into the tubing, a user applies torque and axial pressure to force the reaming tool into the tubing. When the cutters reach the end of the tubing, rotation of the shaft causes the cutting edges to bevel the inner end of the tubing. Applying the axial pressure simultaneously with rotating the tool makes the reaming work difficult, especially if the tubing is wet or slipping. Consequently, there also exists a need for an improved reaming tool.

SUMMARY OF THE INVENTION

It is therefore an object of the invention is to provide a tubing connector for a composite tubing that can be rapidly and accurately installed to provide a dependable fluid tight fitting.

Another object of the invention is to provide a tubing connector which has an integral crimp ring to facilitate the installation of the tubing connector.

Yet a further object of the invention is to provide a reaming tool for a composite tubing that is easy to use and reduces effort.

In accordance with one aspect of the invention, a tubing connector comprises a rigid tubular body having a fitting end, a cylindrical connector end, and a bore that extends from the fitting end to the connector end. A crimp ring is connected to the fitting end in a concentric relationship with the connector end to permit the tubing to be slid over the connector end under the crimp ring. The crimp ring is adapted to be compressed around the outer periphery of the end portion of the tubing. At least one opening extends radially through the crimp ring adjacent the fitting end to permit one end of the tubing to be seen in order to ensure that the tubing is completely inserted into an annulus between the connector end and the crimp ring. The crimp ring is made of a rigid deformable material, such as a copper alloy.

In accordance with a further aspect of the invention, there is provided a method of manufacturing a tubing connector for a tubing having a plastic inner periphery comprising steps of forming a shoulder on a fitting end of the tubing connector; sliding a crimp ring over a connector end of the tubing connector and onto the shoulder; and connecting-the crimp ring to the shoulder so that an annulus for receiving the tubing is formed between the connector end and the crimp ring.

In accordance with a further aspect of the invention there is provided a reaming tool for enlarging and bevelling an open end of a tubing to facilitate insertion of the tubing connector into the tubing. The reaming tool comprises a shaft and at least one cutter attached to the shaft. The cutter has a cutting edge oriented at a predetermined angle with respect to a longitudinal axis of the shaft. A guide screw is attached to a free end of the shaft, and has an external surface adapted to enlarge the open end of the tubing and automatically draw the cutting edge towards the open end of the tubing when the shaft is rotated in one direction.

The guide screw is preferably a cylindrical body having a plurality of parallel spiral ridges on the external surface. The guide screw preferably has a diameter greater than a diameter of an internal diameter of the tubing so that the end of the tubing is slightly expanded as the guide screw enters the tubing.

The advantages of the tubing connector in accordance with the present invention relate to the integral crimp ring. With an integral crimp ring, shipping and handling are facilitated and there is no possibility of buying or using the wrong crimp ring for a given tubing connector. The integral crimp ring also facilitates installation of the tubing connector, especially when the tubing is not horizontally oriented, or space around the tubing is limited. The integral crimp ring also ensures that the crimp ring is optionally located over the connector end where it is crimped. A good fluid seal is thereby ensured.

The reaming tool in accordance with to the present invention advantageously reduces the labour associated with installation of the tubing connector because the user needs only to rotate the tool in order to enlarge and bevel the end of the tubing. Axial force is not required.

Other features and advantages of the present invention will be understood with reference to the description of the preferred embodiments which follows.

BRIEF DESCRIPTION OF THE DRAWINGS

Further features and advantages of the present invention will become apparent from the following detailed description, taken in combination with the appended drawings, in which:

FIG. 5 is an elevational view of a reaming tool according to a preferred embodiment of the invention;

FIG. 6 is a bottom plan view of the embodiment shown in FIG. 5, with the handle of the tool removed, to illustrate the position of the cutters; and FIG. 7 is a partial cross-sectional view of the reaming tool in a working condition.

It will be noted that throughout the appended drawings, like features are identified by like reference numerals.

DETAILED DESCRIPTION OF THE PREFERRED EMBODIMENT

Figure 1:
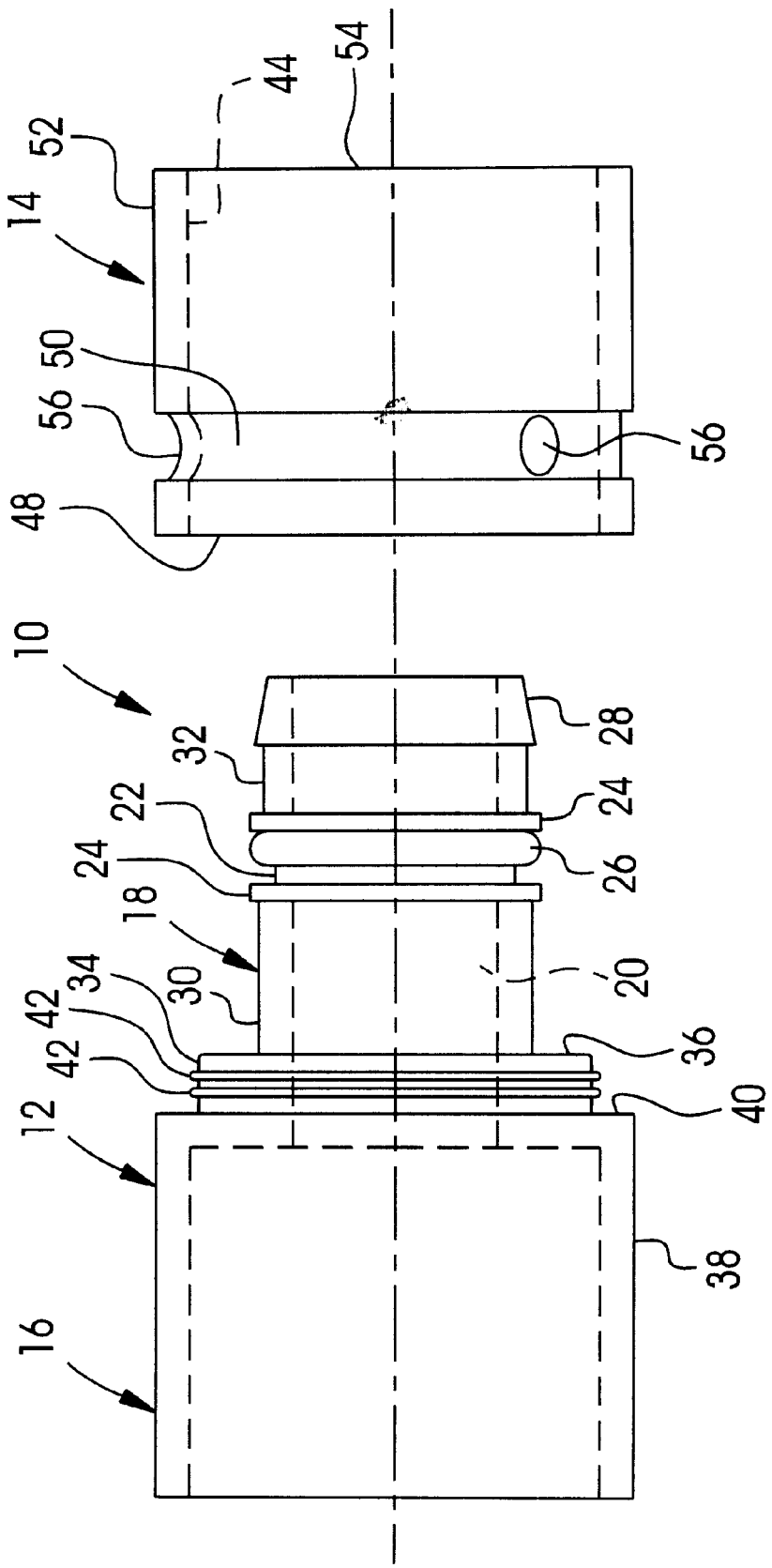
FIG. 1 is an elevational and exploded view of a tubing connector in accordance with a preferred embodiment of the invention, showing a crimp ring detached from a tubular body of the tubing connector.
Figure 3:
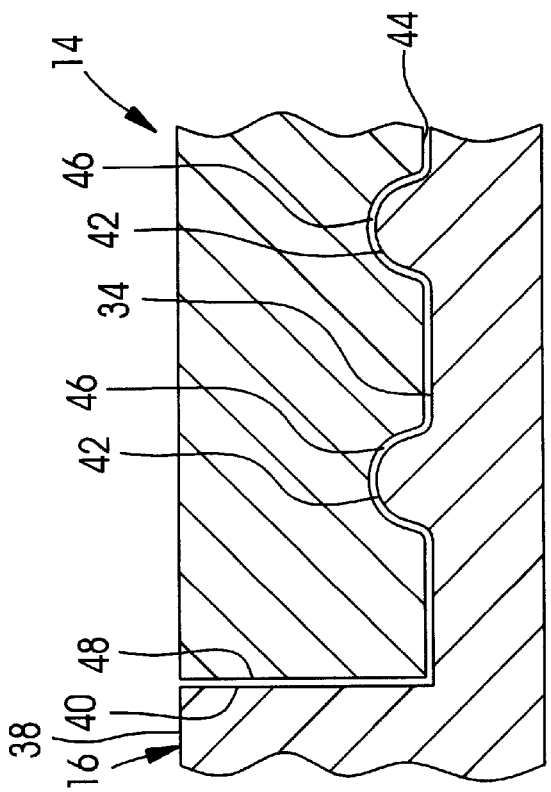
FIG. 3 is a partial cross-sectional view of the embodiment shown in FIG. 2, illustrating in an enlarged scale the attachment of the crimp ring to the tubular body of the tubing connector.
Figure 2:
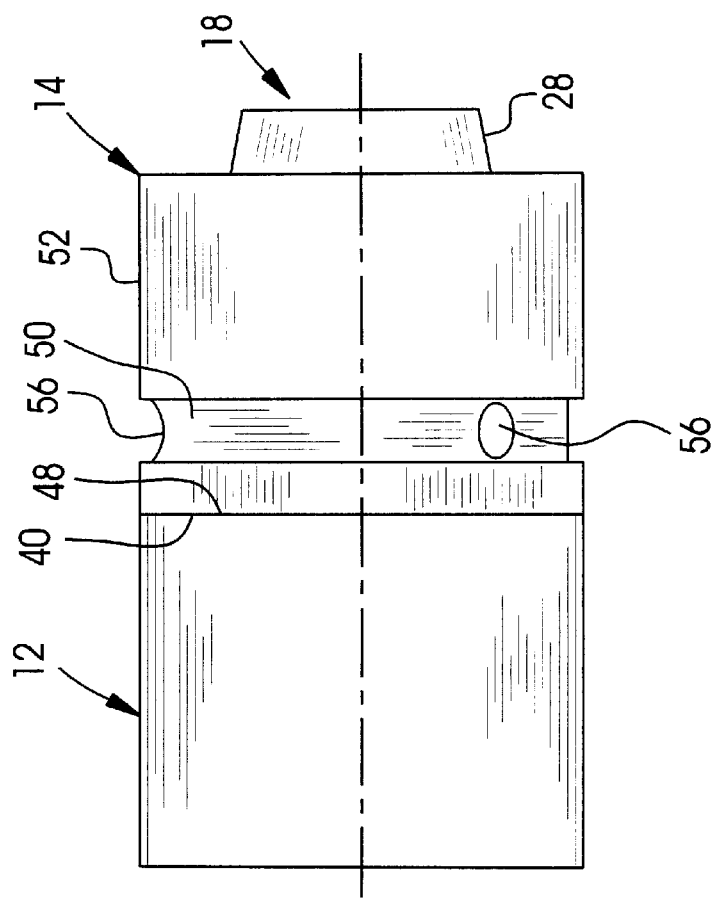
FIG. 2 is an elevational view of the embodiment shown in FIG. 1, showing the crimp ring is attached to the tubular body of the tubing connector for use.

In FIGS. 1 through 3, the tubing connector in accordance with a preferred embodiment of the invention, generally indicated by numeral 10, comprises a rigid tubular connector 12 and an integral crimp ring 14. The rigid tubular connector 12 preferably made of brass, has a fitting end 16 and a cylindrical connector end 18. A bore 20 extends from connector end 18 to the fitting end 16. At least one annular groove 22 is provided on an external periphery 24 of the connector end 18. An elastic seal ring 26 is received in the at least one annular groove 22. The seal ring 26 may be an O-ring as shown, or a thin flat band (not illustrated). The innermost section of the connector end 18 is tapered, as indicated by reference numeral 28. The tapered section 28 facilitates insertion of the connector end 18 into a tubing. The connector end 18 preferably has annular regions 30 and 32 that one slightly recessed from the external periphery 24 to reduce the friction between the external periphery 24 of the connector end 18 and the tubing when the connector end is inserted into the tubing.

The fitting end 16 of the embodiment shown in FIG. 1 is cylindrical, but may have any shape required of a fitting. A shoulder 36 is formed between the fitting end 16 and the connector end 18. The shoulder 36 has a diameter 34 that extends to an interface 40 between the shoulder 40 and the fitting 38. As noted above, the fitting 38 may be any type of a fitting, such as a male or female adapter, a Tee, a 90° elbow or any other coupling. The shoulder 36 preferably includes at least one annular ridge 42 used to connect the crimp ring to the connector, as will be explained below.

The crimp ring 14 has an inner periphery 44 having a diameter that is slightly larger than a diameter 34 of the shoulder 36. The crimp ring 14 is made of rigid deformable material, preferably a copper alloy. The crimp ring 14 may be connected to the connector 16 in one of two ways. In a first method, the crimp ring is manufactured so that the inner periphery 41 has a diameter,equal or slightly greater than that of the ridges 42. The crimp ring 14 is slid over the shoulder 36 and then radially compressed. Because copper alloy is softer than brass, grooves 46 are formed in the inner periphery 44 as the crimp ring 14 is compressed over the ridges 42 (FIG. 3). Another.option is to machine the crimp ring with grooves 46 so that when the crimp ring 14 is forced onto the shoulder using axial pressure exerted by a press, or the like, the ridges 42 are received in the respective grooves 46. The ridges 42 are preferably parallel so that the crimp ring 14 is rotatable with respect to the tubular body 12, regardless of the manner in which the crimp ring is attached thereto. This permits the fitting end 16 to be rotated even after the crimp ring 14 is crimped, which may be required to reorient the fitting for any of a number of reasons that are well understood in the art.

An annular groove 50 is preferably provided on an external periphery 52 of the crimp ring 14. The groove 50 is axially spaced apart from the first end 48, and the axial space between the first end 48 and the groove 50 is substantially equal to the width of the shoulder 36. The annular groove 50 reduces the rigidity of the connection between the first end 48 and a second end 54 of the crimp ring 14 so that the deformation at the second end 54 will be less impeded by the restraint of the first end 48 due to its attachment to the shoulder 36. Openings 56 are preferably formed in the bottom of the annular groove 50, only one of which is shown in FIGS. 1 and 2. The openings 56 extend radially through the crimp ring. Preferably three or more openings 56 are equally and circumferentially spaced apart to enable an installer to determine when a tubing is properly seated on the connector, as will be explained below in more detail.

Figure 4:
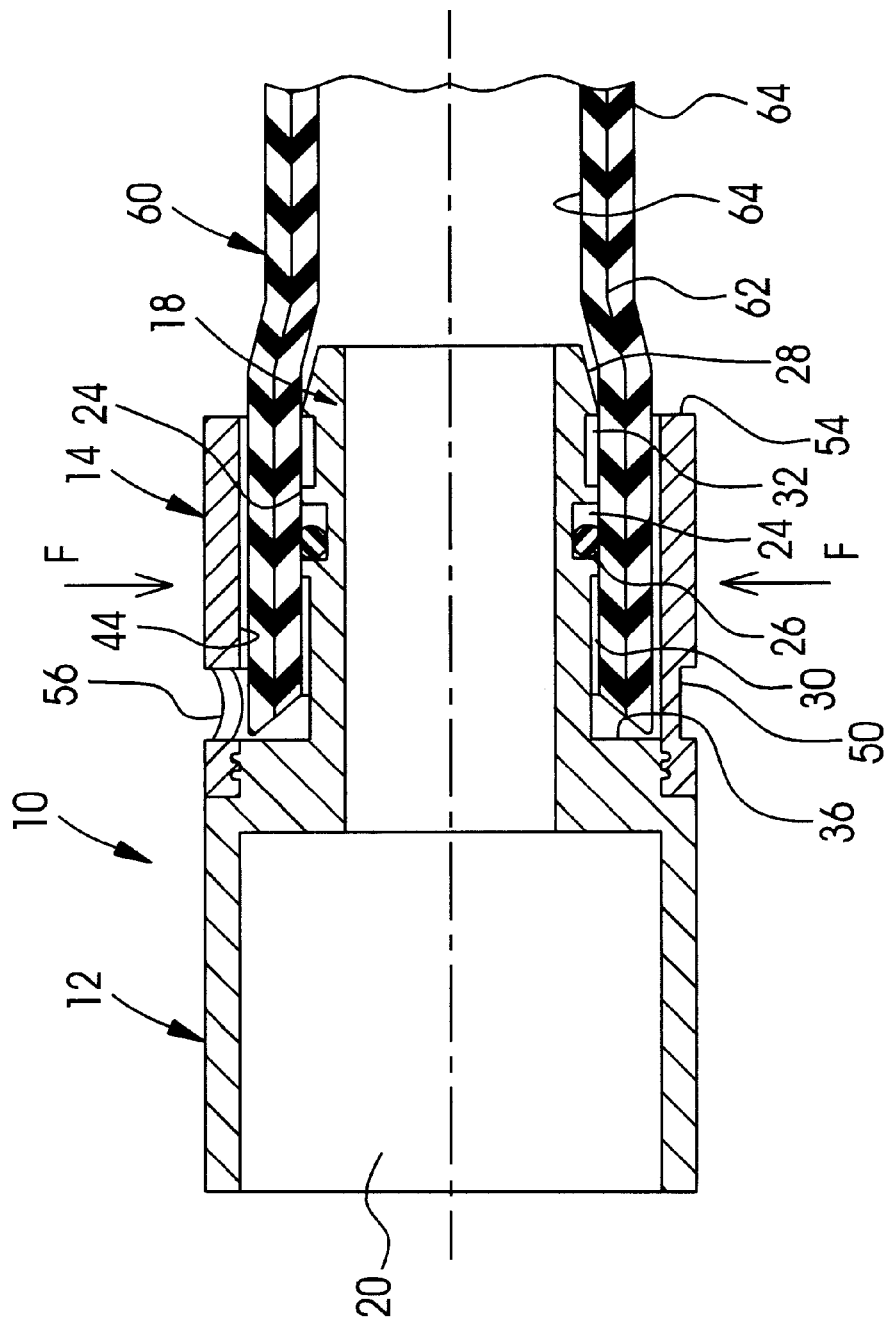
FIG. 4 is a cross-sectional view of the tubing connector installed in a tubing.

The tubing connector 10 is used in connection with a tubing 60 as shown in FIG. 4. The tubing 60 may be a synthetic (cross-linked polyethylene) or a composite tubing (aluminum and cross-linked polyethylene). For the sake of example, a composite tubing is illustrated in FIG. 4 but it should be understood that any reference to tubing in this document includes both synthetic and composite tubings. The composite tubing includes an aluminium tubing 62 laminated between two layers of a thermoplastic 64. The composite tubing is flexible and deformable but is less elastic than synthetic tubing of the same diameter, and therefore maintains its shape when bent or deformed. In order to install the tubing connector 10 in the tubing 60, the end of the tubing 60 is inserted into the annulus formed between the external periphery 24 of the connector end 18 and the inner periphery 44 of the crimp ring 14 until the end of the tubing moves past the elastic seal ring 26 and stops at the shoulder 36. The tapered end portion 28 of the connector end 18 helps guide the tubing onto the connector. The openings 56 provide windows to permit an installer to visually confirm that the tubing 60 is seated against the shoulder 36. After the tubing 60 is inserted into the annulus of the tubing connector 10, as shown in FIG. 4, the crimp ring 14 is crimped with a hand tool (not shown). The groove 50 helps to position the hand tool in an optional position for compressing the crimp ring. Radial pressure exerted by the hand tool, indicated by the arrows F, compresses the tubing between the crimp ring 14 and the connector end 18. Since the position of the crimp ring 14 is fixed, with respect to the tubular connector 12, an optional seal is ensured.

A reaming tool is preferably used to enlarge and bevel the end of the tubing to facilitate insertion of the tubing connector 10. An improved reaming tool 70 in accordance with the invention is illustrated in FIGS. 5 through 7. The reaming tool, generally indicated by the reference numeral 70 includes a shaft 72, a handle 74 attached to a top end of the shaft and a guide screw 76 coaxially mounted to a free end of the shaft 72. The guide screw 76 is a cylindrical body with parallel spiral ridges 78 that protrude from an external surface 80 of the guide screw 76. The number of spiral ridges is optional, but 4 or 5 have been determined to be adequate. A diameter of the guide screw 76 defined by the spiral ridges 78 is greater than the internal diameter of the tubing 60 so that when the guide screw 76 is inserted into the tubing 60 and rotated, frictional force between the spiral ridges 78 and the tubing 60 automatically draws the tool 70 into the tubing 60.

A cutter head 82 which is generally cylindrical is attached to the shaft 72 above the guide screw 76 for supporting a plurality of cutters 84. In the embodiment shown in FIG. 6, the cutter head 82 supports three cutters 84 that are equally and circumferentially spaced apart. Each of the cutters 84 has a cutting edge 86 oriented at a predetermined angle with respect to the longitudinal axis of the shaft 72. As the guide screw 76 draws the reaming tool 70 down into the tubing 60 and the end of the tubing reaches to the cutters 84, the inner periphery of the end of the tubing 60 is bevelled by the cutting edge 86, as shown in FIG. 7.

The elongated handle 74 attached to the other end of the shaft 72 facilitates the rotation of the tool. However, other types of handle may be used for the same purpose.

The embodiments of the invention described above are intended to be exemplary only. The scope of the invention is therefore intended to be limited solely by the scope of the appended claims.

I claim:

1. A tubing connector for sealingly engaging an end portion of a tubing adapted to serve as a conduit for pressurized fluid comprising:

a rigid tubular body having a fitting end, a cylindrical connector end and a bore that extends from the fitting end to the connector end; and a crimp ring connected to the fitting end in a concentric relationship with the connector end to permit the tubing to be slid over the connector end under the crimp ring, the crimp ring including an annular groove adjacent the fitting end to reduce the rigidity thereof so that the crimp ring is easily crimped even though it is attached to the fitting end of the tubular body, the crimp ring includes at least one opening adjacent the fitting end that extends radially therethrough to permit an end portion of the tubing to be observed when the tubing is slid over the connector end, and the at least one opening is located in the annular groove on the crimp ring.

2. A tubing connector as claimed in claim 1 wherein the crimp ring is connected to the fitting end by at least one annular groove on an inner periphery of the crimp ring, at least one annular ridge on the fitting end, whereby the annular ridge engages the annular groove to connect the crimp ring to the tubular body.

3. A tubing connector as claimed in claim 2 wherein the crimp ring is rotatable with respect to the tubular body.

4. A tubing connector as claimed in claim 1 wherein the connector end comprises at least one annular groove and an elastic seal ring is received in the groove to promote a fluid seal between the tubing and the connector end when the tubing is slid over the connector end.

5. A tubing connector as claimed in claim 1 wherein the crimp ring is made of a copper alloy.

6. A method of manufacturing a tubing connector for a tubing having a plastic inner periphery, comprising steps of:

forming a shoulder on a fitting end of the tubing connector;

forming a groove in the outer periphery of a crimp ring so that the groove is adjacent the shoulder when the crimp ring is attached to the tubing connector, and forming at least one opening in the groove in the outer periphery of the crimp ring;

sliding the crimp ring over a connector end of the tubing connector and onto the shoulder; and attaching the crimp ring to the shoulder so that an annulus for receiving the tubing is formed between the connector end and the crimp ring.

* * * * *